United States Patent
Hiromori

(10) Patent No.: US 7,529,290 B2
(45) Date of Patent: May 5, 2009

(54) RADAR APPARATUS

(75) Inventor: Masaki Hiromori, Kanagawa (JP)

(73) Assignees: Fujitsu Ten Limited, Kobe (JP); Fujitsu Limited, Kawasaki (JP)

( * ) Notice: Subject to any disclaimer, the term of this patent is extended or adjusted under 35 U.S.C. 154(b) by 828 days.

(21) Appl. No.: 11/059,332

(22) Filed: Feb. 17, 2005

(65) Prior Publication Data

US 2005/0180491 A1 Aug. 18, 2005

(30) Foreign Application Priority Data

Feb. 17, 2004 (JP) .............................. 2004-040149

(51) Int. Cl.
*H04B 1/00* (2006.01)
(52) U.S. Cl. ...................... 375/148; 375/142; 375/150; 375/327
(58) Field of Classification Search ................. 375/148
See application file for complete search history.

(56) References Cited

U.S. PATENT DOCUMENTS

| 3,480,956 | A | | 11/1969 | Sanderson | |
|---|---|---|---|---|---|
| 5,959,571 | A | * | 9/1999 | Aoyagi et al. | 342/70 |
| 6,424,289 | B2 | * | 7/2002 | Fukae et al. | 342/27 |
| 6,509,864 | B1 | | 1/2003 | Mende et al. | |
| 2001/0015699 | A1 | | 8/2001 | Chiles et al. | |
| 2003/0204806 | A1 | * | 10/2003 | Hisada et al. | 714/758 |

FOREIGN PATENT DOCUMENTS

| DE | EP 1 376 152 A2 | 1/2004 |
|---|---|---|
| JP | A 09-211111 | 8/1997 |
| JP | A 2000-310675 | 11/2000 |
| JP | A 2002-290273 | 10/2002 |

* cited by examiner

*Primary Examiner*—Shuwang Liu
*Assistant Examiner*—Lihong Yu
(74) *Attorney, Agent, or Firm*—Oliff & Berridge, PLC

(57) ABSTRACT

A radar apparatus has a code generator, a transmission section, a reception section, a delay section, a despreading processor, a correlation value detector, a target detector, and an adjustment section. The transmission section transmits a signal modulated with a spectrum spread code. The reception section receives a direct wave from the transmission section and a reflection wave of the transmitted signal from a target. The delay section delays the despread code stepwise. The despreading processor performs a despreading processing with respect to a signal obtained from the reflection wave received, with using the despread code delayed. The correlation value detector detects a correlation value from data output from the despreading processor. The adjustment section adjusts a phase shift between the spectrum spread code and the despread code so that a correlation strength of the direct wave is equal to or larger than a predetermined value.

7 Claims, 15 Drawing Sheets

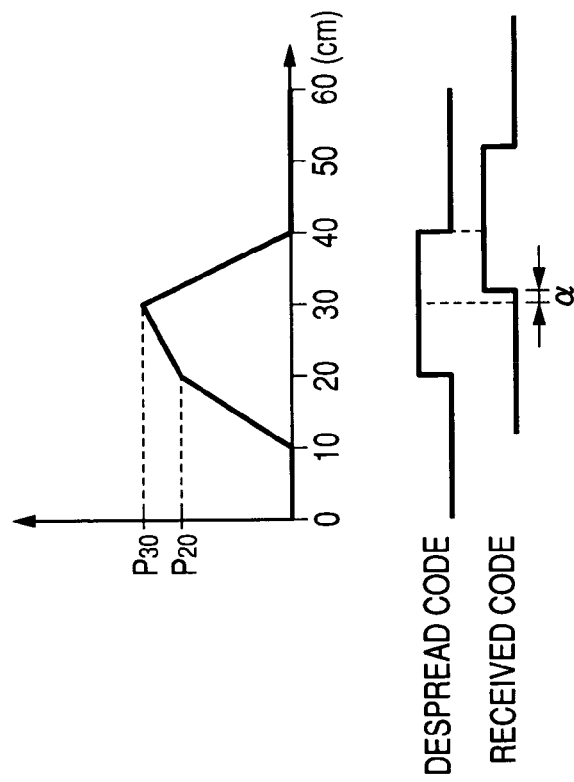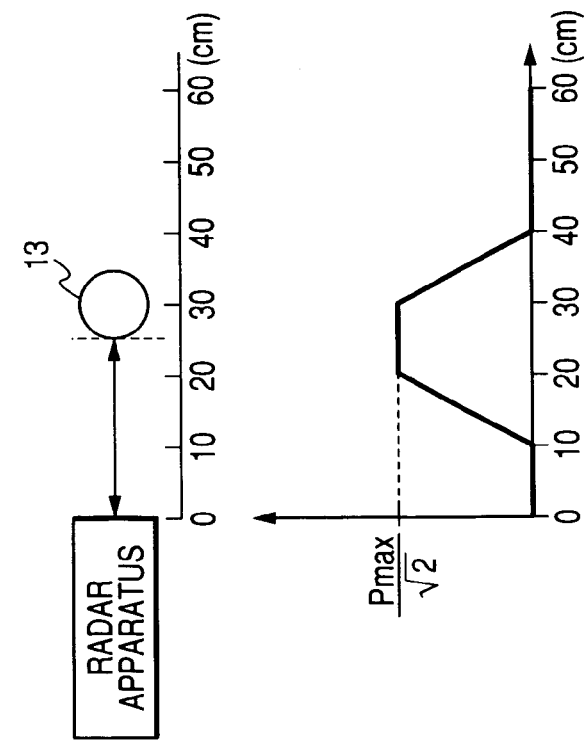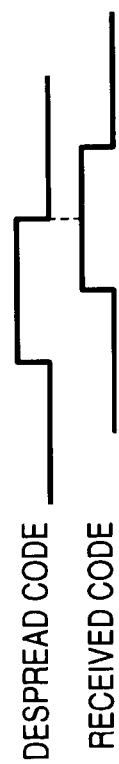

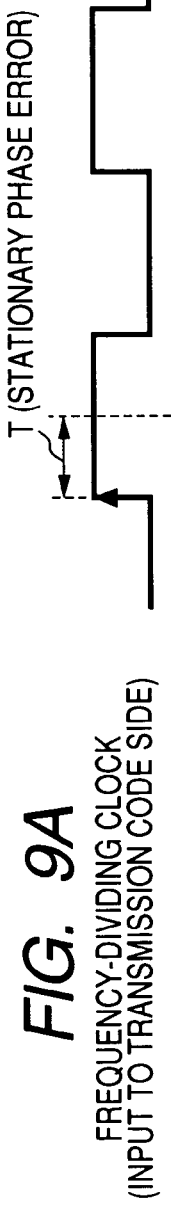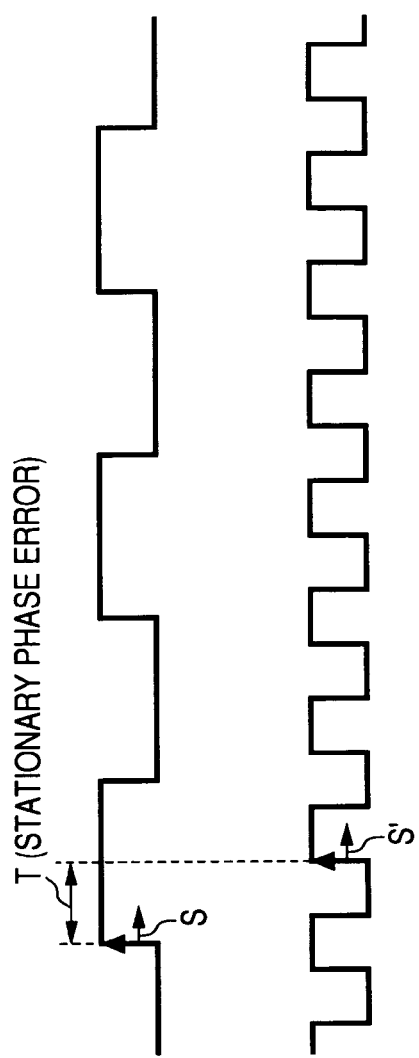
FIG. 9A
FREQUENCY-DIVIDING CLOCK
(INPUT TO TRANSMISSION CODE SIDE)
FIG. 9B
PLL CLOCK
(OUTPUT FROM TRANSMISSION CODE SIDE)
FIG. 9C
FREQUENCY-DIVIDING CLOCK
(INPUT TO DESPREAD CODE SIDE)
FIG. 9D
PLL CLOCK
(OUTPUT FROM DESPREAD CODE SIDE)

FIG. 15
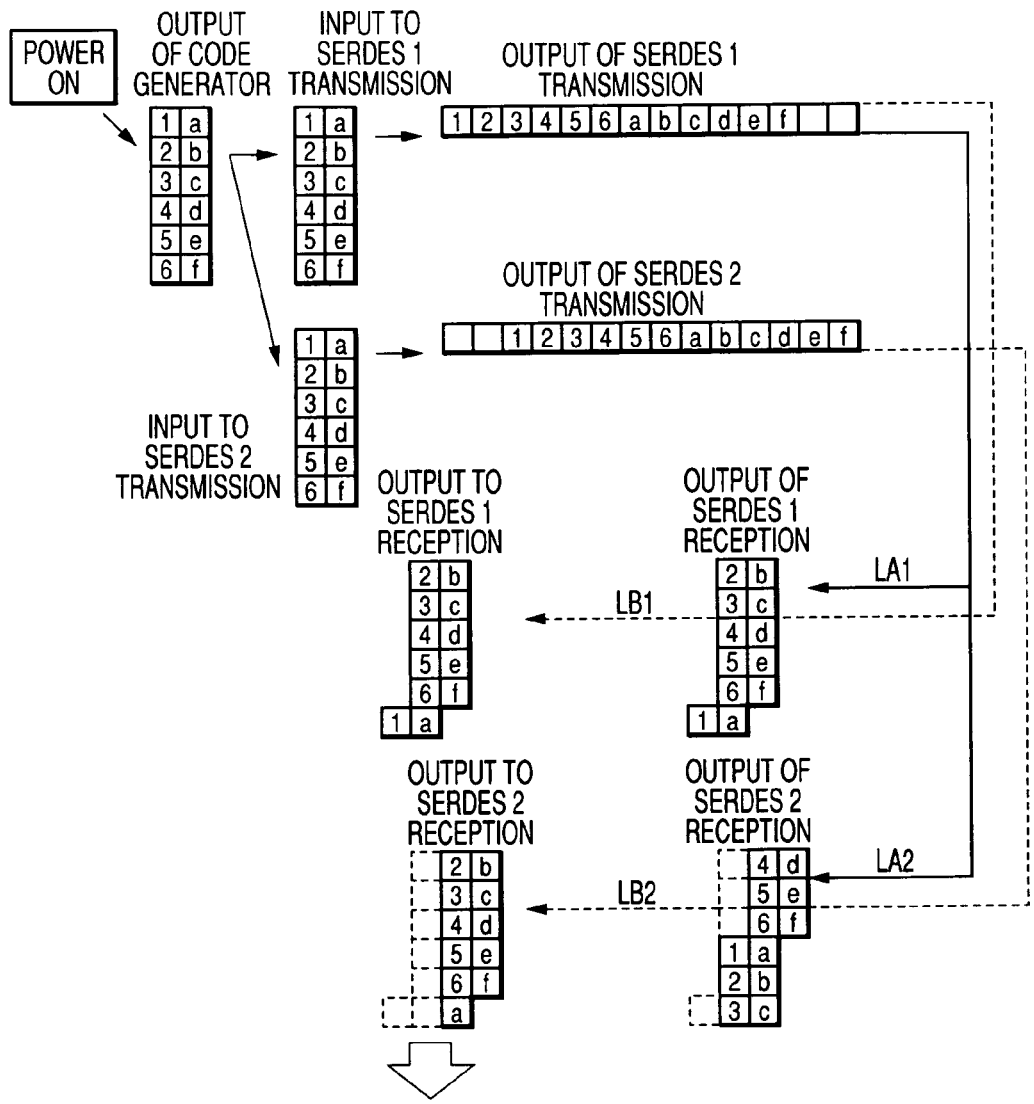
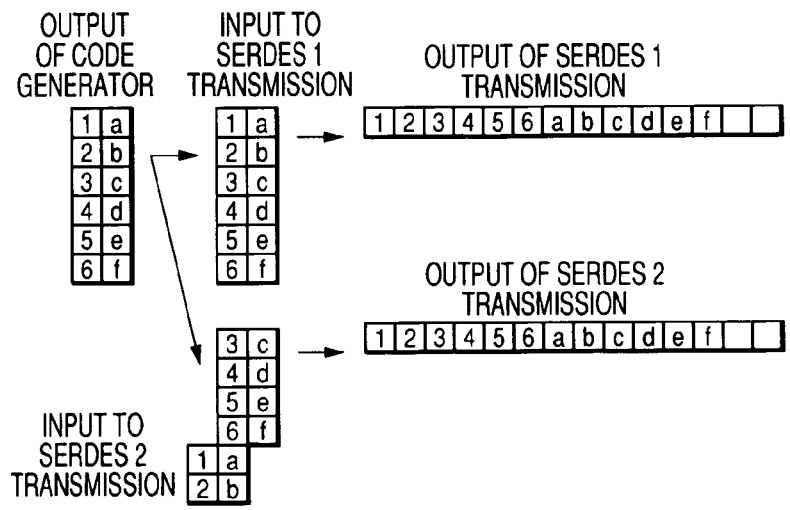

the same amount. A fixed delay section 10 generates the delay for the above purpose (i.e., initial delay).

RADAR APPARATUS

BACKGROUND OF THE INVENTION

1. Field of the Invention

The present invention relates to a radar apparatus based on a spread spectrum technique.

2. Description of the Related Art

UWB (ultra wide band) radar apparatuses, which employ a spread spectrum technique, have been developed. In the spread spectrum technique, data are spread in a wide band with use of a certain code sequence so as to reduce influences of interference from other communication systems. In a case where, for instance, the radar apparatus is an on-vehicle radar apparatus, the radar apparatus can detect, with high precision, whether or not an obstacle (a target) is present ahead of the vehicle, a distance between the vehicle and the target, and a relative velocity to the target.

In the radar apparatus, in order to determine a distance to the target, a despread code for use in despreading a received wave reflected from the target is delayed with respect to a transmission code by a predetermined amount in accordance with the distance. Therefore, when the amount of delay is varied under the influence of changes in the characteristics of a semiconductor device—which constitute the radar apparatus—due to a change in temperature and/or power supply variation, a shift occurs between a phase of the transmission code and that of the despread code. As a result, a correlation property between the transmission code and the despread code varies. In some cases, such a change in the correlation property gives rise to an error in detection of a distance to the target.

FIG. 1 is a block diagram showing a schematic structure of a radar apparatus, which employs a conventional spread spectrum technique. In FIG. 1, reference numeral 1 denotes a code generator for generating a spectrum spreading code and a despread code. Reference numeral 2 denotes a spread/transmission processor for modulating a transmission signal with the spectrum spreading code generated by the code generator 1 and for conducting transmission processing. Reference numeral 3 denotes a transmission antenna for transmitting the signal having been subjected to the spreading processing.

Reference numeral 4 denotes a reception antenna for receiving an electric wave having been transmitted from the transmission antenna 3, reflected by a target 13, and returned, in other words, for receiving a reflected wave 14 reflected by the target 13. The reception antenna 4 also receives a direct wave 15 transmitted from the transmission antenna 3. Reference numeral 15 denotes a reception processing section for conducting demodulation processing of the signal received by the reception antenna 4. Reference numeral 6 denotes a stepped delay section for delaying the despread code generated by the code generator 1 stepwise. Reference numeral 7 denotes a despreading processor for conducting despreading processing of the received signal with the despread code having been delayed by the stepped delay section 6 and for further effecting A/D conversion. Reference numeral 8 denotes a correlation value detector for detecting a correlation value from the thus despread and A/D converted data. Reference numeral 9 denotes a target detector for conducting a variety of types of processing, such as determination of a distance to the target, determination of a reception intensity, determination of a relative velocity between the target and the own vehicle, determination of identification of the target on the basis of the detected correlation value.

The result of the processing by the target detector 9 is displayed on an unillustrated display, thereby calling attention to a driver; alternatively, the result may be input to an ECU of the vehicle, to thereby be utilized in a variety of driving controls.

In the apparatus shown in FIG. 1, timing of receiving a direct wave, which is directly transmitted by the antenna 3 and received by the antenna 4, involves a predetermined amount of delay with respect to a timing of generating code by the code generator 1. Such delay depends on the physical structure, arrangement, and the like, of equipment. Accordingly, the despread code generated by the code generator 1 must be delayed by the same amount. A fixed delay section 10 generates the delay for the above purpose (i.e., initial delay).

FIG. 2 is a timing chart for explaining operations of the apparatus shown in FIG. 1, and particularly showing how a distance to the target is detected. In FIG. 2, (a) shows a code sequence for spread spectrum generated by the code generator 1 and (b) shows a despread code sequence delayed stepwise by the stepped delay section 6. For the purpose of synchronization with the received code, the fixed delay section 10 gives a predetermined initial delay to the despread code sequence (b).

The despread code sequence (b) is formed by delaying transmission codes (1), (2), (3), ..., (n) in increments of, e.g., one clock cycle, by the stepped delay section 6. In FIG. 2, (c) shows a received code sequence of a direct wave; (d) shows a code sequence of a wave reflected by a target spaced from the radar apparatus by a distance corresponding to one clock cycle; (e) shows a code sequence of a wave reflected by a target spaced from the radar apparatus by a distance corresponding to two clock cycles.

As shown in FIG. 2, in a case of despreading the received code sequence (c) of the direct wave by use of the despread code sequence (b), a code 1 shows a strong correlation; and the remaining codes do not show strong correlations because phases of the received codes and those of the despread codes are deviated. Similarly, the code sequence (d) of the wave reflected by the target spaced a distance corresponding to one clock cycle shows a strong correlation with a code 2 of the despread code sequence (b). Furthermore, the code sequence (e) of the wave reflected by the target spaced a distance corresponding to two clock cycles shows a strong correlation with a code 3 of the despread code sequence (b).

Accordingly, when the received wave (f) is despread with the despread code sequence (b) and then a correlation value of each code is detected, it is detected whether or not a target for producing a reflected wave is present at each of distances as shown in (g) of FIG. 2. More specifically, presence of a target is indicated when a strong correlation is found among correlation properties at distances corresponding to 0 m, 0 m +1 clock cycle, 0 m+2 clock cycles, . . . .

As described above, the UWB radar apparatus employing the spread spectrum technique correlates the despread code having been delayed stepwise by the step delay section with the received code; and determines a presence of a target and a distance to the target on the basis of the correlation properties. Therefore, a phase of the despread code and that of the received code must be in accurate synchronization. When for some reason the phase relationship between the both codes differs from a predetermined one, proper correlation strength cannot be obtained in detection of correlation values as shown in (g) of FIG. 2. As a result, a correct distance to the target cannot be detected.

However, the characteristics of a semiconductor device, which constitutes the radar apparatus, are easily changed under the influence of a change in temperature and/or power supply variation. In addition, degrees of the variations are not uniform among devices. Consequently, in the despreading processor, a phase shift occurs between the received code and the despread code.

FIG. 3 shows a phase shift (a delay difference) between a despread code and a received code arising from a change in temperature and/or power supply variation. When a signal speed is low, such a small phase shift is of little consequence. However, the phase shift exerts great influence on a device using high-speed signals such as the UWB radar apparatus, resulting in a great change in a correlation property between the received code and the despread code.

When a delay difference as shown in FIG. 3 is found before use of the radar apparatus, the difference can be absorbed by adjusting a value of the fixed delay section 10. However, when such a delay difference is caused by a change in temperature and/or power supply variation during usage, it cannot be absorbed by the fixed delay section 10.

Example references of the invention include JP-A-2002-290273, JP-A-2000-310675, and JP-A-Hei.9-211111. However, these references simply disclose the technical level of general spread spectrum radar apparatuses at the time the invention was made, and neither indicate nor present features of the invention.

SUMMARY OF THE INVENTION

The present invention has been made to solve the above problems in the radar apparatuses described above, and provides a radar apparatus, which can automatically correct a phase shift between a received code and a despread code arising from a change in temperature and/or power supply variation during usage of the radar apparatus, thereby enabling a correct correlation to be obtained without fail.

To solve the above problem, a radar apparatus according to one embodiment of the invention has a code generator, a transmission section, a reception section, a delay section, a despreading processor, a correlation value detector, a target detector, and an adjustment section. The code generator generates a spectrum spread code and a despread code. The transmission section transmits a signal modulated with the spectrum spread code. The reception section receives a direct wave from the transmission section and a reflection wave of the transmitted signal from a target. The delay section delays the despread code stepwise. The despreading process or performs a despreading processing with respect to a signal obtained from the reflection wave received, with using the despread code delayed. The correlation value detector detects a correlation value from data output from the despreading processor. The target detector detects a presence of the target from the correlation value detected. The adjustment section adjusts a phase shift between the spectrum spread code and the despread code so that a correlation strength of the direct wave is equal to or larger than a predetermined value.

When a relationship between a phase of the spectrum spreading code and that of the despread code is offset from a normal range due to the influence of a temperature or power supply variation, the correlation property changes. This change results in change of waveform of the correlation property and deterioration of the correlation strength. To this end, a direct wave—whose propagation distance is univocally determined by physical structure, arrangement conditions, and the like of radar equipment and the like—is utilized. More specifically, by means of adjusting a phase shift between the spectrum spreading code and the despread code so that measured correlation strength of the direct wave takes a maximum value (which may include a certain margin), a phase shift between the codes can be corrected. Thus, a correct correlation property is acquired with use of the spectrum spreading code and the despread code whose phase shift has been corrected As a result, causes for an error in distance detection are reduced, thereby enabling accurate detection of a distance to the target.

The adjustment section may have a delay control section that delays one of the spectrum spread code and the despread code. When the code generator has a first PLL-circuit-containing P/S conversion circuit for generation of the spectrum spread code and a second PLL-circuit-containing P/S conversion circuit for generation of the despread code, the adjustment section may have a delay control section that delays one of inputs to the first and second PLL-circuit-containing P/S conversion circuits so that the correlation strength of the direct wave is equal to or larger than the predetermined value.

To solve the above problem, a radar apparatus according to another embodiment of the invention has a code generator, a transmission section, a reception section, a delay section, a despreading processor, a first correlation value detector, a target detector, and a second correlation value detector. The code generator generates a spectrum spread code and a despread code. The transmission section transmits a signal modulated with the spectrum spread code. The reception section receives a reflection wave of the transmitted signal from a target. The delay section delays the despread code stepwise. The despreading processor performs a despreading processing with respect to a signal obtained from the reflection wave received, with using the despread code delayed. The first correlation value detector detects a correlation value from data output from the despreading processor. The target detector detects a presence of the target from the correlation value detected by the first correlation value detector. The second correlation value detector detects a correlation value between the spectrum spread code and the despread code, which are generated by the code generator. The code generator generates the spectrum spread code and the despread code on a basis of the correlation value detected by the second correlation value detector so that the correlation value detected by the second correlation value detector is equal to a predetermined value.

A circuit portion for radio transmission-reception has an operation clocking, which is considerably higher in frequency than a circuit portion for code generation. Accordingly, there are some cases where a change in temperature and/or power supply variation occurring in the circuit portion is of little consequence in terms of characteristics. In such a case, a detection result of a direct wave, which involves complicated analysis and control, is not used; and there is acquired a correlation property between the spectrum spreading code and the despread code, which are generated by the code generator. operations of the code generator are adjusted so that the correlation value attains a predetermined value; more specifically, a correlation value of a case where a phase difference between the spectrum spreading code and the despread code falls within a normal range. Consequently, even when a phase of a spectrum spreading code and that of a despread code, both of which are for transmission, produces a shift arising from a change in temperature and/or power supply variation, the phase shift can be adequately corrected, thereby enabling acquisition of an accurate correlation.

Meanwhile, when the code generator has a first PLL-circuit-containing P/S conversion circuit for generation of the spectrum spread code and a second PLL-circuit-containing P/S conversion circuit for generation of the despread code, the code generator may have a delay control section that delays one of inputs to the first and second PLL-circuit-containing P/S conversion circuits so that the correlation value detected by the second correlation value detector is equal to the predetermined value. With this configuration, the phase shift between the spectrum spread code and the despread code can be corrected.

Furthermore, when the first PLL-circuit-containing P/S conversion circuit further integrally comprises an S/P conversion circuit for reception and the second PLL-circuit-containing P/S conversion circuit further integrally comprises an S/P conversion circuit for reception, the radar apparatus may have a loopback section that loops back an output of the first PLL-circuit-containing P/S conversion circuit to the S/P conversion circuit of the second PLL-circuit-containing P/S conversion circuit.

BRIEF DESCRIPTION OF THE DRAWINGS

FIGS. 5A and 5B are views for explaining an influence of a phase shift between a received code and a despread code;

FIG. 9 is a view showing a relationship between a frequency-dividing clock and a PLL clock;

FIG. 15 is view for explaining operations of a circuit portion shown in FIG. 14.

DETAILED DESCRIPTION OF THE PREFERRED EMBODIMENTS

First Embodiment

A UWB radar apparatus according to a first embodiment of the invention will be described hereinafter.

Figure 4B:
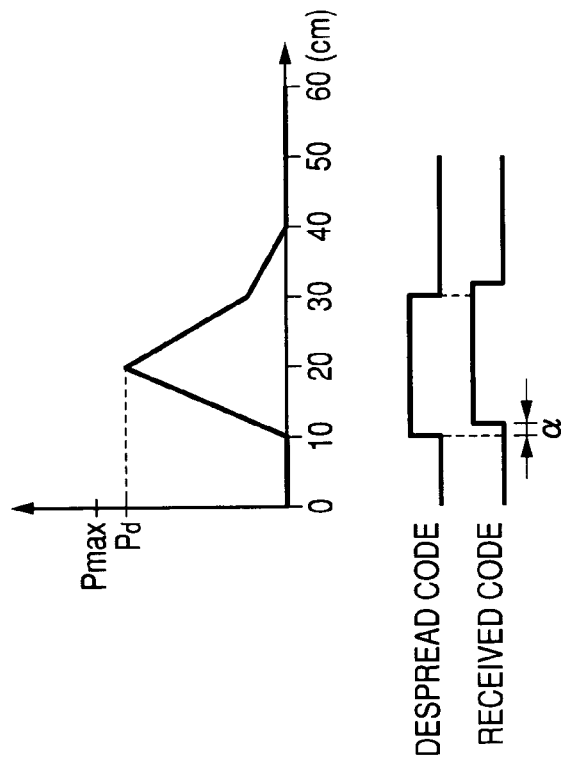
FIGS. 4A and 4B are views for explaining an influence of a phase shift between a received code and a despread code on an auto-correlation property.
Figure 4A:
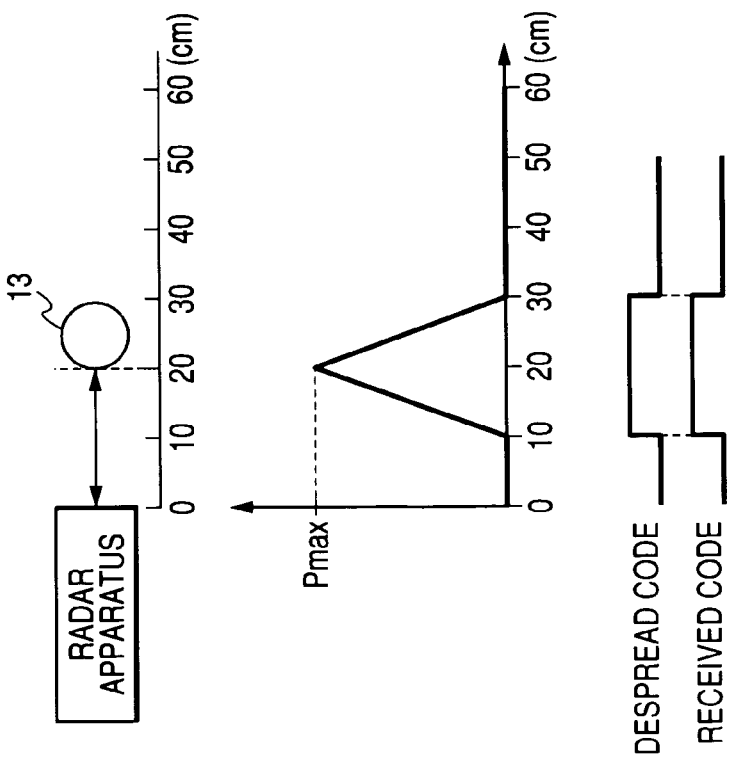

First, how a correlation value changes in a case where a despread code and a received code are out of synchronism with each other will be described. FIGS. 4A and 4B show changes in correlation values arising from a synchronization deviation occurring in a case where a target is at a reference detection distance. FIGS. 5A and 5B show the same occurring in a case where a target is at a midpoint between two reference detection distances. Meanwhile, in descriptions referring to FIGS. 4A to 5B, a distance resolution is assumed to be 10 cm; and PN codes are used because, if the Gold codes were used instead, the correlation diagram would be complicated.

FIG. 4A shows a correlation property in a case where the target 13 is at a distance of 20 cm from the radar apparatus, and no synchronization shift is produced between the despread code and the received code. In this case, as shown in the drawing, an auto-correlation peak appears only at a distance of 20 cm. Meanwhile, when a synchronization shift cc is produced between the despread code and the received code as shown in FIG. 4B as a result of a change in temperature and/or power supply variation, a peak value at a distance of 20 cm is reduced (from Pmax to Pd), and another small peak appears at a distance of 30 cm.

The peak value at one reference distance (in the example of FIGS. 4A and 4B, 20 cm) being lower than a maximum value, and observation of a small peak at the next reference distance (in the example of FIGS. 4A and 4B, 30 cm) indicate that the target is at a position slightly closer to the next reference distance from the one reference distance. Therefore, if data analysis is performed on the basis of the correlation property obtained from FIG. 4B, the distance to the target is detected to be farther than the actual distance. Consequently, the detected distance includes an error.

FIGS. 5A and 5B show correlation diagrams of a case where the target 13 is at a midpoint between the reference distance of 20 cm and that of 30 cm. In this case, the despread code and the received code have a phase shift of 180 degrees therebetween, as shown in FIG. 5A. Accordingly, two peaks, one at a distance of 20 cm and the other at a distance of 30 cm, and the both having a peak value of Pmax/$\sqrt{2}$, appear. As a result, the target 13 is detected to be at a distance of 25 cm, which is the midpoint between the reference distance of 20 cm and that of 30 cm.

When a temperature or power supply varies during the course of usage of the radar apparatus to thus cause a phase shift α between the despread code and the received code, the waveform of FIG. 5A loses its shape; and, as shown in FIG. 5B, the peak value at a distance of 30 cm increases, and the peak value at a distance of 20 cm decreases. As a result, the target 13 is detected to be closer to the reference distance 30 cm than to the reference distance 25 cm. Consequently, the detected distance includes an error.

Meanwhile, FIGS. 4A to 5B indicate cases where a transmission code is delayed or cases where the despread code is advanced; however, in a case where a transmission code is advanced or where the despread code is delayed, in an opposite manner to that indicated by reference to FIGS. 4A to 5B, the distance from the target is detected to be closer than actual.

As described above, when a phase shift occurs between the despread code and the receiving code under the influence of a change in temperature and/or power supply variation, the wave form of the correlation value loses its shape. Accordingly, if a phase shift between the despread code and the received code can be adjusted so that waveforms of the correlation values shown in FIGS. 4B and 5B shift to those shown in FIGS. 4A and 5A, a phase shift between the despread code and the received code caused by a change in temperature and/or power supply variation can be compensated.

The present invention has been made in light of the above viewpoints. This embodiment utilizes a direct wave whose distance is univocally determined by physical structure, arrangement conditions, and the like, of the radar apparatus. More specifically, a phase difference between a transmission code and despread code, which are generated by a code generator, is adjusted so as to maximize correlation strength of the direct wave. As a result, an accurate correlation value unaffected by a change in temperature and/or power supply variation can be obtained.

Figure 1:
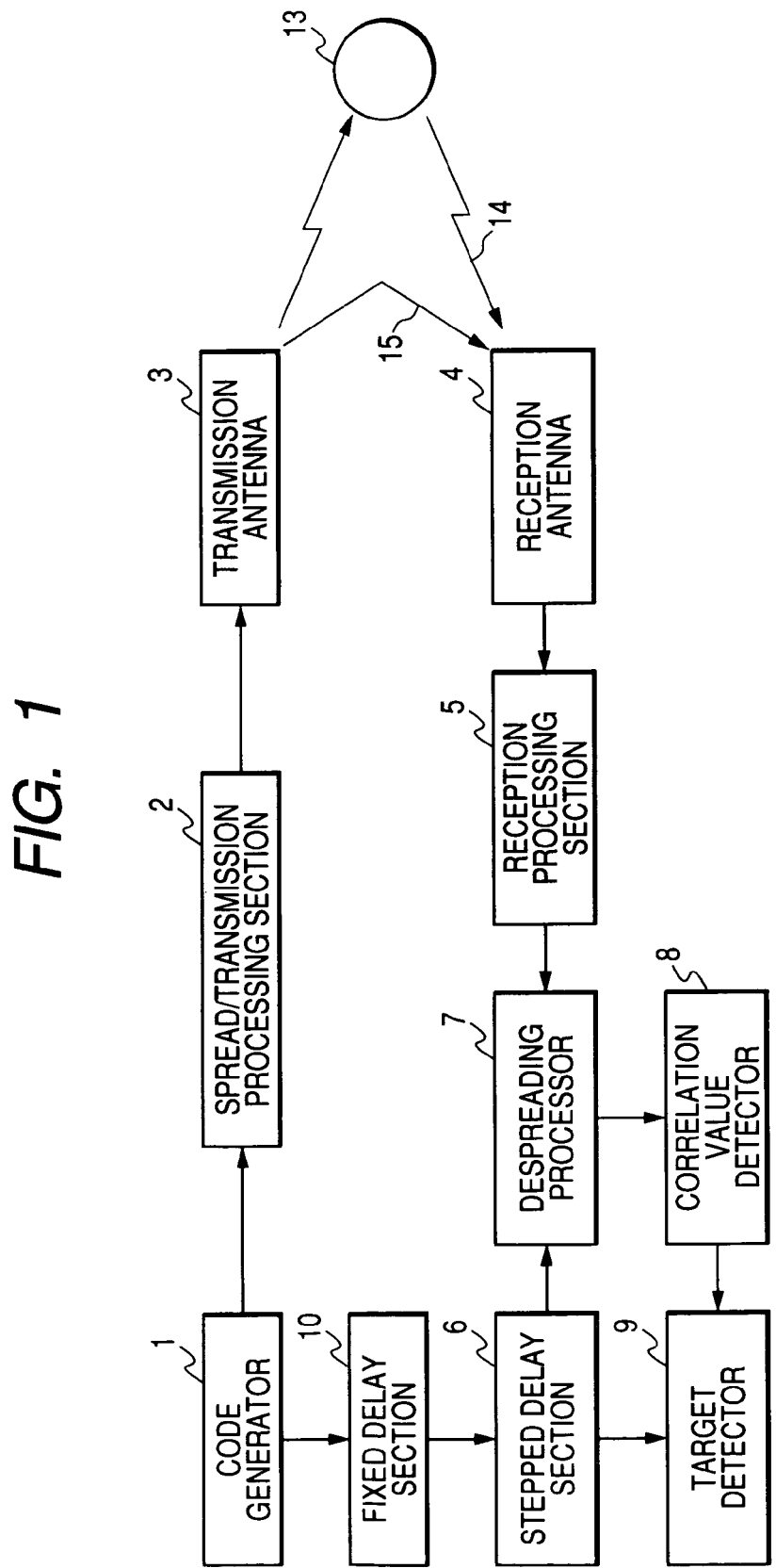
FIG. 1 is a block diagram showing a schematic structure of a general UWB radar apparatus.
Figure 2:
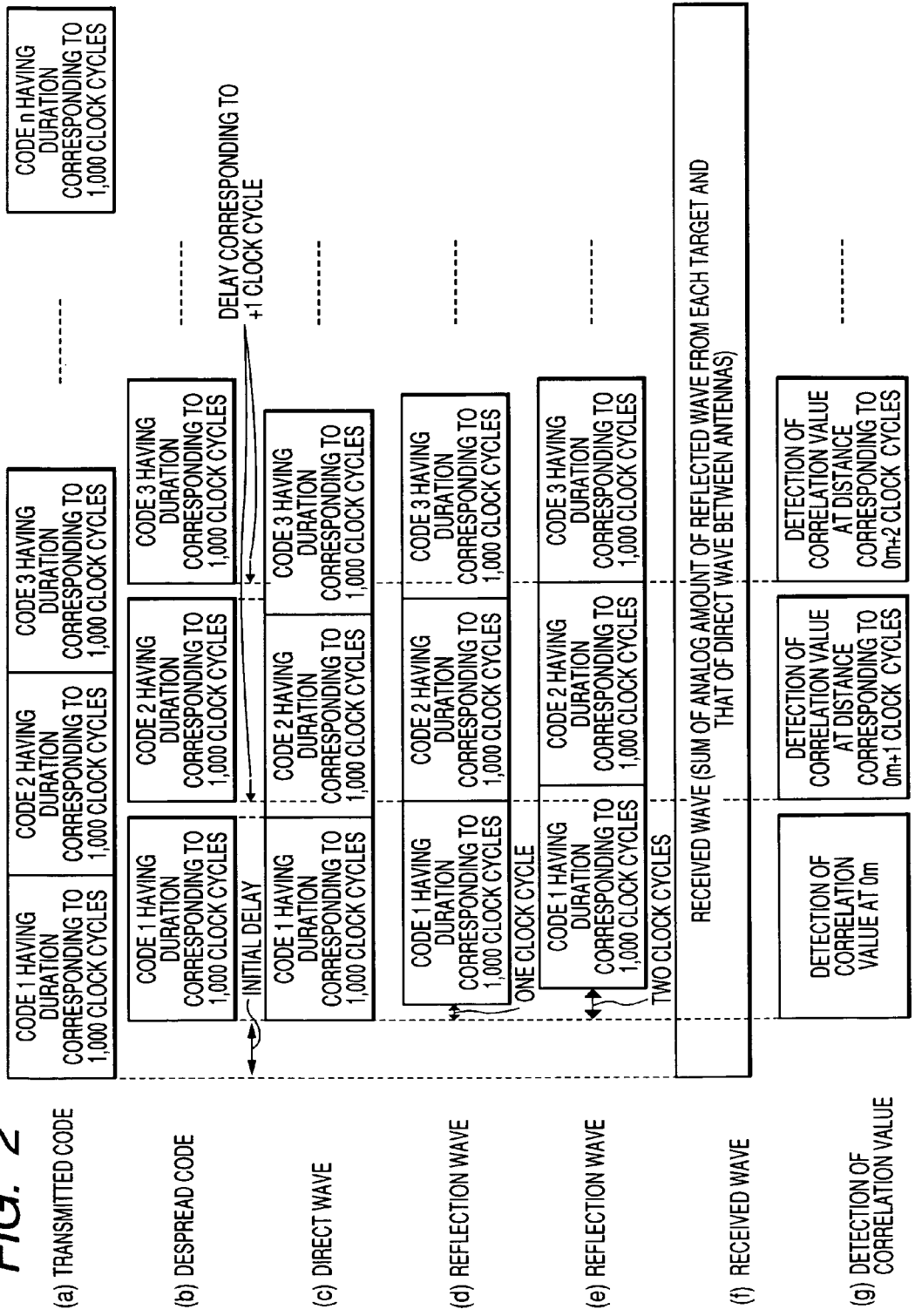
FIG. 2 is a time chart for explaining operations of the device of FIG. 1.
Figure 6:
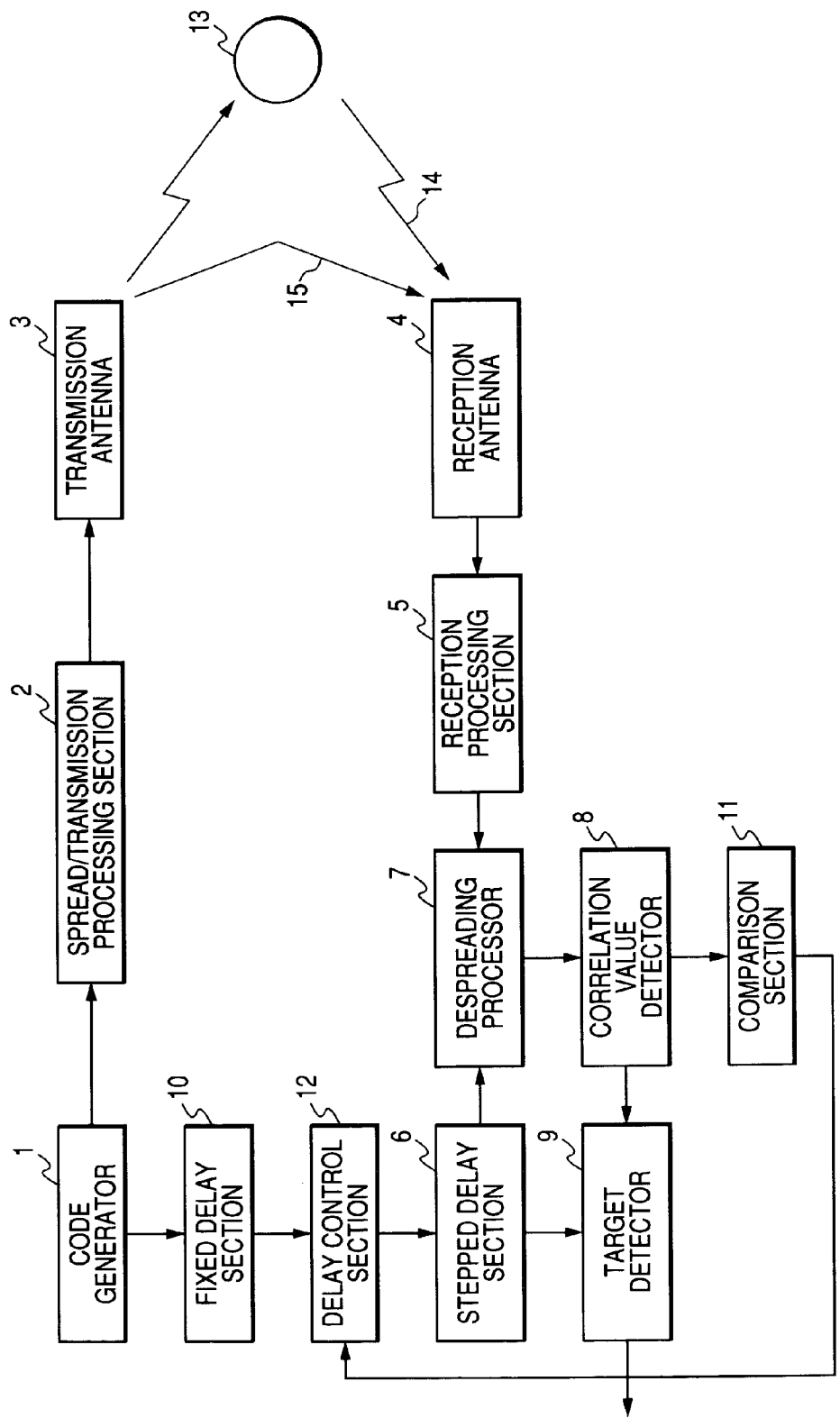
FIG. 6 is a block diagram showing a schematic structure of a UWB radar apparatus according to a first embodiment of the invention.

FIG. 6 shows a UWB radar apparatus configured on a basis of the above concept, according to the first embodiment of the invention. In FIG. 6 and other drawings, which will be described hereinafter, elements denoted by the same reference numerals as FIG. 1 indicate elements identical or similar to those in FIG. 1, and repeated descriptions thereof are omitted.

The UWB radar apparatus shown in FIG. 6 has a comparison section 11 that compares a correlation strength of a direct wave, and a delay control section 12 that performs a delay control of a despread code in accordance with a comparison result by the comparison section 11. The comparison section 11 and the delay control section 12 are disposed on downstream of the correlation value detector 8. The comparison section 11 holds reference data concerning correlation strength of a direct wave, which has been determined on the basis of measurement in advance and set in the radar apparatus. During usage of the radar apparatus, the comparison section 11 compares correlation strength detected by the correlation value detector 8 with the reference data. When a difference between the correlation strength of the direct wave and the reference data is present, the comparison section 11 controls the delay control section 12 to delay the despread code until the comparison results indicates the difference attains zero or falls within a predetermined acceptable range.

As described above with reference to FIGS. 4A to 5B, when the correlation strength of the direct wave is corrected to a value of the reference data, a phase shift between the despread code and the received code is considered to no longer be present, or to fall within the acceptable range. Therefore, when radar measurement is conducted in the above state, a corrected correlation property can be obtained. Meanwhile, the reference data concerning correlation strength of the direct wave is set in equipment with a certain margin before shipment of the radar apparatus.

Figure 7:
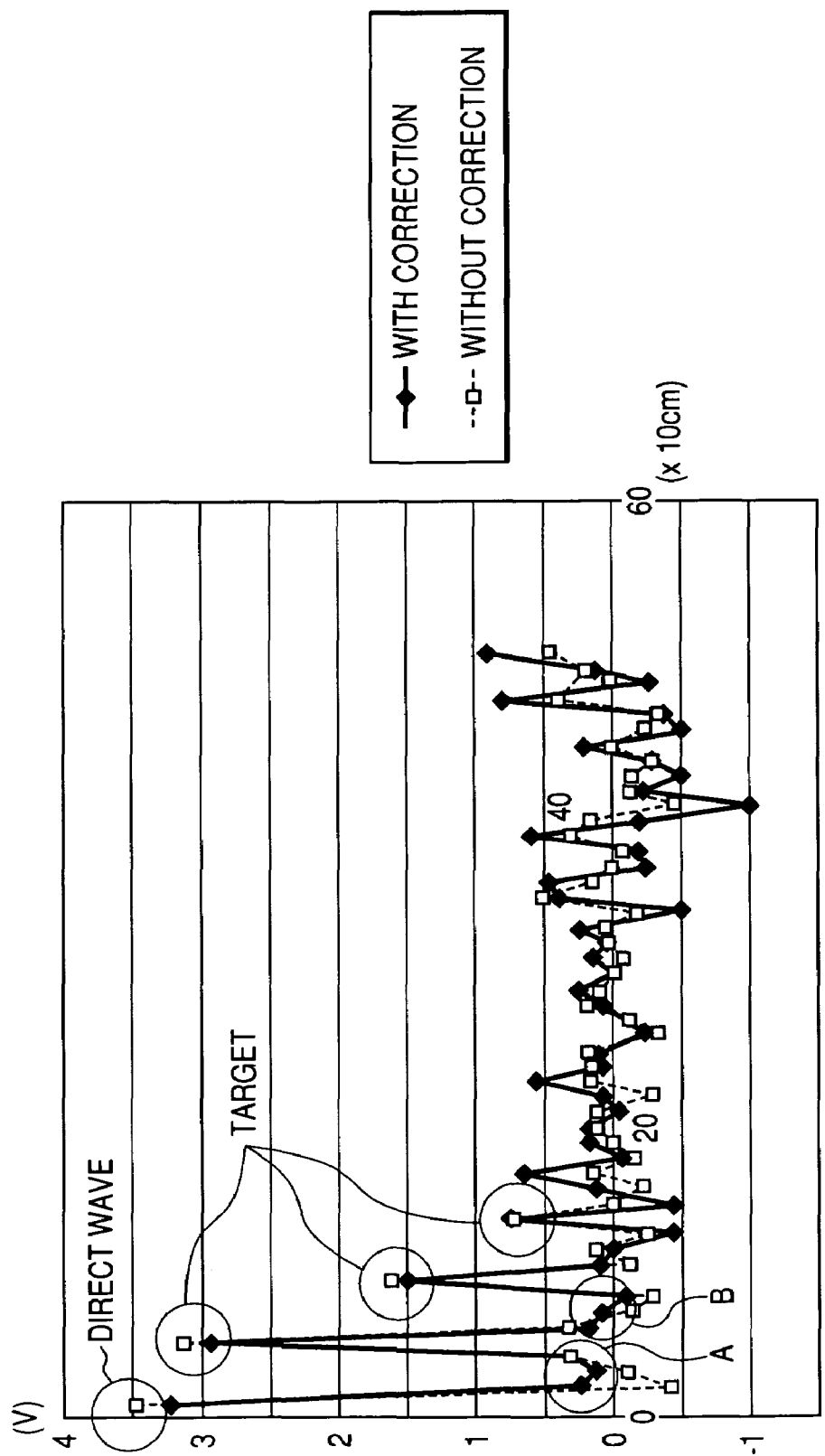
FIG. 7 is a view showing a correlation property acquired with use of the radar apparatus shown in FIG. 6.

FIG. 7 is a view showing correlation property before correction and that after correction. In the drawing, a solid line indicates correlation property data before correction, and a dotted line indicates the same after correction. The drawing indicates that the entire correlation strength of the target has been increased and a phase shift has been corrected. In addition, correlation values after correction are decreased significantly at portions indicated by A and B in the drawing; meanwhile, correlation peak values of the target have increased. As a result, it is considered that correlation values of the portions A and B before correction increases due to a phenomenon indicated in FIG. 4B. Accordingly, by means of performing a delay correction according to the present embodiment, a proper correlation property can be obtained; and by means of performing data analysis on the basis of the correlation property, causes of distance error can be eliminated, thereby enabling accurate detection of a distance.

Meanwhile, in the first embodiment shown in FIG. 6, the delay control section 12 is disposed downstream of the fixed delay section 10; however, the present embodiment is not limited to this configuration. For instance, the delay control section 12 may be disposed upstream of the fixed delay section 10; or, alternatively, the delay control section 12 may be disposed further upstream thereof and between the code generator 1 and the spread/transmission processor 2 to perform a delay control of a transmission code. In addition, in a case where a despread code is delayed with respect to a received code, control for advancing a phase of the despread code is performed. An object of the control by the delay control section 12 is to return a phase relationship between the despread code and the received code to a normal relationship.

Second Embodiment

A second embodiment of the invention will be described hereinafter.

When a high-speed signal of several hundred MHz or faster is generated, a method of converting a signal sequence generated at a low speed into a high-speed signal with use of a PLL (phase locked loop) circuit or the like has generally been adopted. In the second embodiment, a transmission code and a despread code are generated with use of a code generator including a PLL circuit, and a control corresponding to the delay control in the first embodiment is performed during the course of the generation of the transmission code and the despread code.

Figure 8:
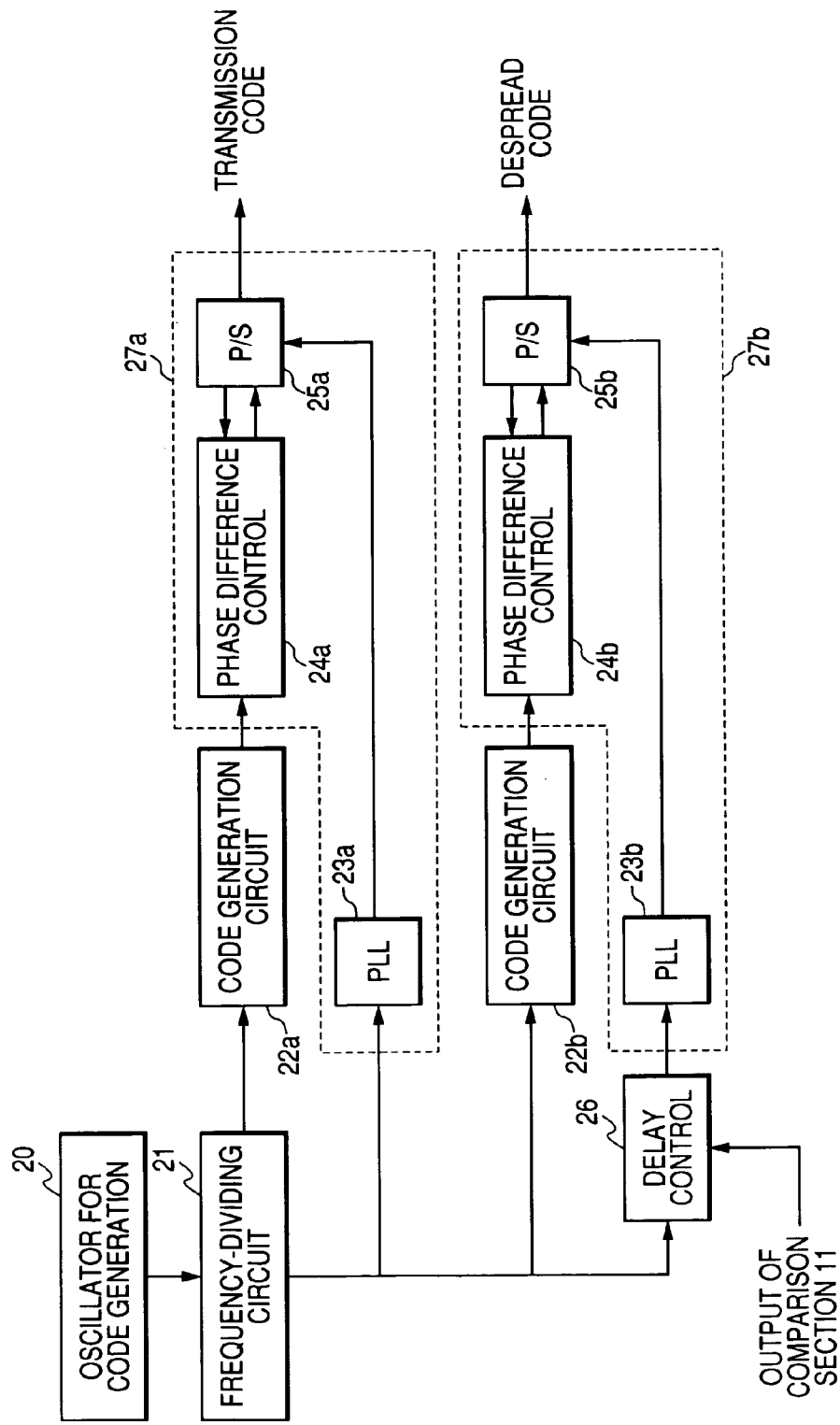
FIG. 8 is a block diagram showing a structure of an essential portion of a UWB radar apparatus according to a second embodiment of the invention.

FIG. 8 shows the code generator 1 of FIG. 6, which is configured to include a PLL circuit. In FIG. 8, reference numeral 20 denotes an oscillator for oscillating a clock signal for code generation; and 21 denotes a frequency-dividing circuit for further increasing speed of the signal generated by the oscillator 20. The output from the frequency-dividing circuit 21 is output to a code generation circuit 22$a$ for generation of a transmission code, to a code generation circuit 22$b$ for generation of a despread code, to a PLL circuit 23$a$ for generation of a transmission code, and to a PLL circuit 23$b$ for generation of a despread code.

A code generated by the code generation circuit 23$a$ is output-to a parallel-serial (hereinafter referred to as "P/S") conversion circuit 25$a$ by way of a phase difference control circuit 24$a$ such as a FiFo (first-in first-out). The thus-output code is converted into a high-speed signal by the PLL circuit 23$a$, and thereafter output as a transmission code. A code sequence generated by the code generation circuit 22$b$ is also output to a P/S conversion circuit 25$b$ by way of a phase difference control circuit 24$b$, such as a FiFo, in a similar manner as above. The thus-output code sequence is converted into a high-speed signal by the PLL circuit 23$b$, and thereafter output as a despread code.

The code sequence output from the P/S conversion circuit 25$a$ is output to the spread/transmission processor 2 of FIG. 6. The code sequence output from the P/S conversion circuit 25$b$ is input to the despreading processor 7 by way of the fixed delay section 10 and the stepped delay section 6 of FIG. 6.

The circuit of FIG. 8 may be configured not to include the frequency-dividing circuit 21. Alternatively, functions of portions 27$a$ and 27$b$, which are indicated by dotted lines in FIG. 8, may be configured with a SerDes (Serializer/Deserializer) circuit.

In the present embodiment, a delay control section 26 is disposed inside the code generator in place of the delay control section 12 of the first embodiment; and the delay control section 26 performs delay control of the PLL circuit 23$b$ for generation of a despread code. The delay control is performed by means of delaying or advancing a phase of a despread code until a difference between the reference strength and the detected strength of a direct wave by the comparison section 11 reaches substantially zero. Accordingly, an output from the comparison section 11 shown in FIG. 6 is input into the delay control section 26.

As described above, in the second embodiment, a delay control is performed inside the code generator; in contrast, the first embodiment is configured such that the delay control is performed outside the code generator 1.

FIG. 9 is a timing chart illustrating timings between frequency-dividing clock signals generated by the frequency-dividing circuit 21, and clock signals (i.e., PLL clock signals) output from the PLL circuits 23a and 23b. FIG. 9A indicates an input signal (a frequency-dividing clock) input to the PLL circuit 23a on the transmission code side; and FIG. 9B indicates a clock signal output from the PLL circuit 23a. In addition, FIG. 9C indicates an input signal (a frequency-dividing clock) input to the PLL circuit 23b on the despread code side; and FIG. 9D indicates a clock signal output from the PLL circuit 23b.

As shown in the drawing, outputs from the PLL circuits 23a, 23b maintain a uniform phase relationship with respect to low-speed clock signals (frequency-dividing clock signals) supplied from the outside; in other words, include a stationary phase error T. In this case, when the delay S is given to the frequency-dividing clock as shown in FIG. 9C, the PLL clock signal is also delayed by an amount S' in accordance with the delays as shown in FIG. 9D, thereby delaying the despread code. Meanwhile, in FIG. 8, a delay control is performed with respect to the PLL circuit 23b for generation of a despread code; however, the same effect can be obtained even when a delay control for advancing a phase is performed with respect to the PLL circuit 23a for generation of a transmission code.

Meanwhile, the same effect as above can be obtained even when a delay control is performed with respect to a clock output from the PLL circuit 23a or 23b. In this case, the delay control can be performed in smaller increments. However, when the delay control is performed with respect to the clock signal output from the PLL circuit, compensation of properties or fabrication of circuits becomes difficult, resulting in an increase in the cost of the radar apparatus.

Accordingly, in the second embodiment shown in FIG. 8, the delay control is performed only in rough increments to a certain extent. However, by means of delaying the clock signals output from the frequency-dividing circuit 21, the same delay control of the despread code or of the transmission code as in the first embodiment is achieved. Accordingly, the delay control can be performed by a simple and inexpensive configuration.

Third Embodiment

Figure 10:
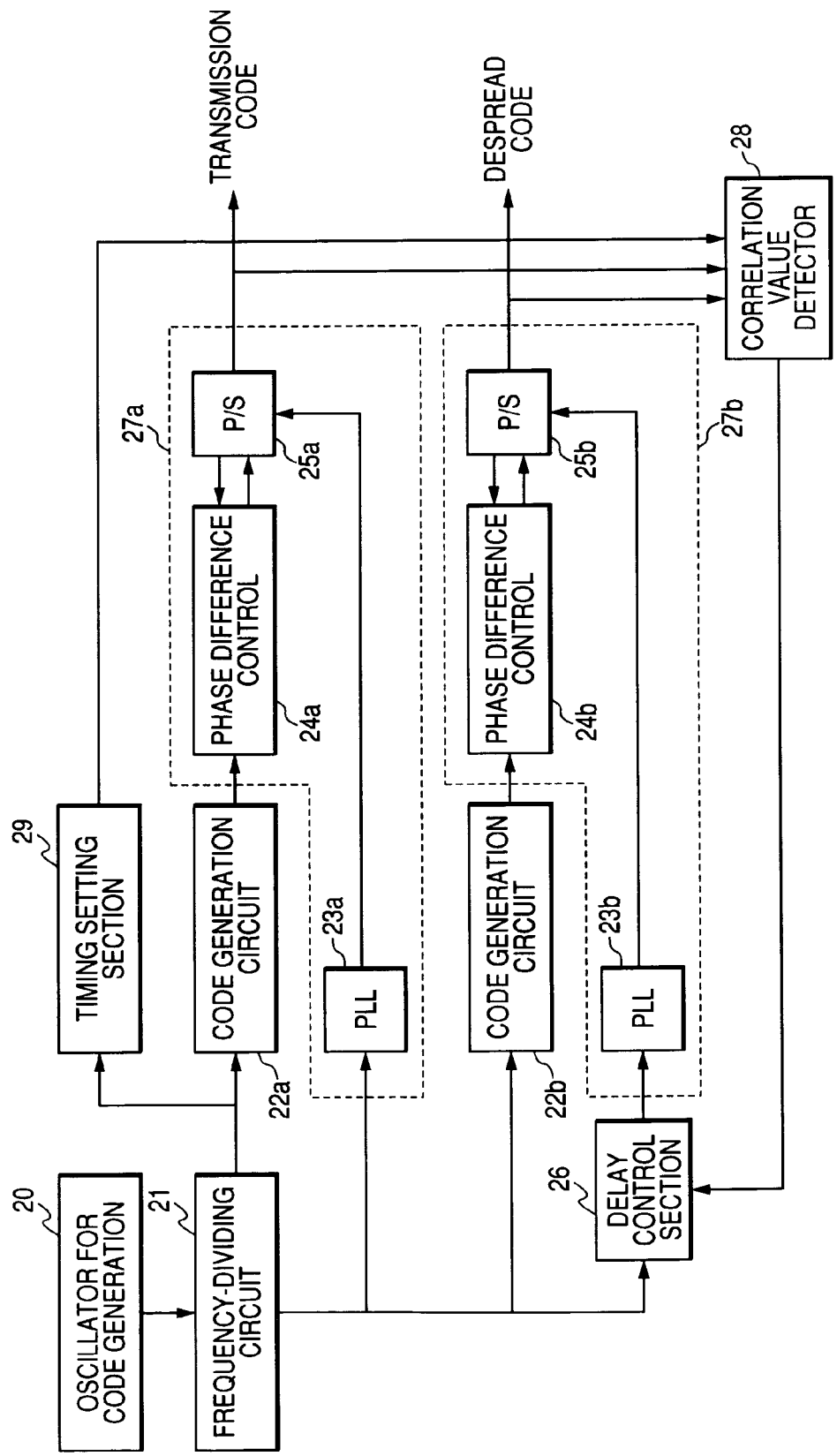
FIG. 10 is a block diagram showing a structure of an essential portion of a UWB radar apparatus according to a third embodiment of the invention.

FIG. 10 is a circuit diagram showing the configuration of a code generator of a UWB radar apparatus according to a third embodiment. The UWB radar apparatus of the present embodiment is configured on an assumption that a change in temperature and/or power supply variation in a mechanism for radio transmission-reception processing including the spread/transmission processor 2, the transmission antenna 3, the reception antenna 4, and the receiving processor 5, all of which are elements of the UWB radar apparatus shown in FIG. 6, have no substantial effect on characteristics. Operation speeds of components constituting the radio transmission-reception mechanism are generally about several tens of GHz; in contrast, an operation speed of the code generation section is about several GHz. Accordingly, a change in temperature and/or power supply variation in the radio transmission-reception mechanism has a small influence, about one-tenth that of the code generation section, and the influence is negligible when importance is placed on cost of the radar apparatus.

Therefore, when the circuit of FIG. 6 may be configured without consideration of a change in temperature and/or power supply variation of the spread/transmission processor 2, the transmission antenna 3, the reception antenna 4, and the receiving processor 5, phase adjustment may be conducted by means of a portion including the circuitry including the code generator 1, the fixed delay section 10, the delay control section 12, the stepped delay section 6, and the despreading processor 7. Therefore, it is not necessary to adjust a phase shift between a transmission code and a despread code on the basis of a detection result of a direct wave, whose analysis and control is complicated.

The present embodiment adopts such a configuration that correlation between the transmission code and the despread code, which are generated in the code generator 1, is calculated, and a phase shift between the transmission code and the despread code is corrected on the basis of the correlation value.

Figure 3:
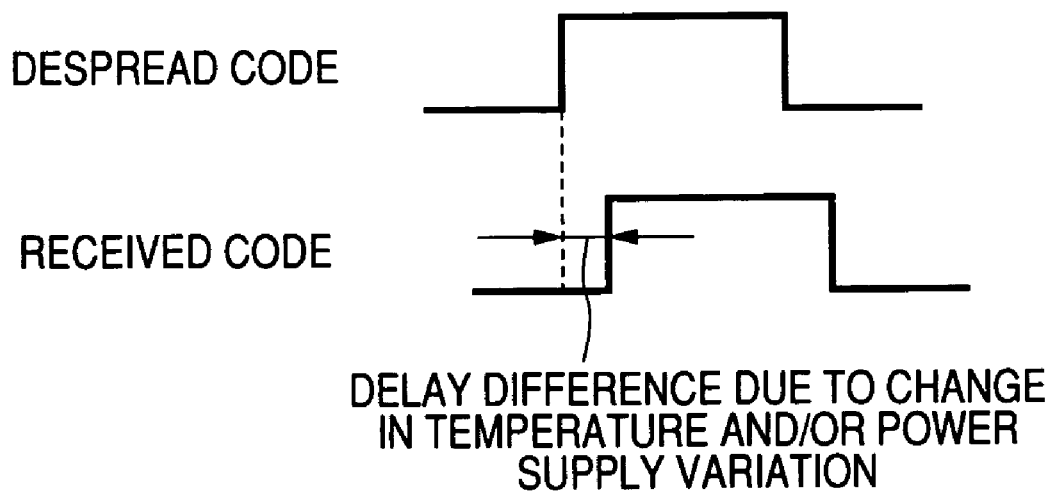
FIG. 3 is a view for explaining influences of a change in temperature and/or power supply variation on a received code and a despread code.

Accordingly, the radar apparatus of the present embodiment is configured as follows. That is, as shown in FIG. 10, the code generator shown in FIG. 3 further has a correlation value detector 28 and a timing setting section 29. The correlation value detector 28 detects a correlation value between a transmission code and a despread code. The timing setting section 29 determines a timing for acquiring the correlation value. The delay control section 26 performs a delay control so that a detected correlation value is rendered a predetermined value; more specifically, a correlation value obtained in a case where a change in temperature and/or power supply variation produces no phase shift between the transmission code and the despread code. By virtue of the above configuration, most influences caused by a change in temperature and/or power supply variation on a correlation value can be eliminated. The timing for acquiring the correlation value is determined appropriately on the basis of equipment design.

Meanwhile, the configuration shown in FIG. 10 utilizes the code generator shown in FIG. 8; however, the present embodiment is not limited to this configuration. That is, as a matter of course, the object of the present embodiment can be achieved when the UWB radar apparatus of the first embodiment shown in FIG. 6 is configured such that a correlation property detector for acquiring a correlation property between the transmission code and the despread code is provided at an output section of the code generator 1, and the delay control section 12 is controlled on the basis of the result thereof.

Fourth Embodiment

The code generator utilizing a PLL function as shown in FIGS. 8 and 10 can control bit phases of the P/S conversion circuits on the transmission code side and on the despread code side up to a certain operation speed. However, when the operation speed of the device increases further, control of the bit phases of the P/S conversion circuits becomes difficult. This is because the control of the bit phases of the PS conversion circuit depends on capability of the device. In addition, in a case where portions 27a and 27b indicated by dotted lines in FIGS. 8 and 10 are formed of general-purpose components, such as a SerDes circuit, the bit phase of each of the P/S conversion circuits cannot be controlled. The present embodiment aims at resolving a phase shift between the transmission code and the despread code, which is caused as a result of such a circuit configuration.

Figure 11:
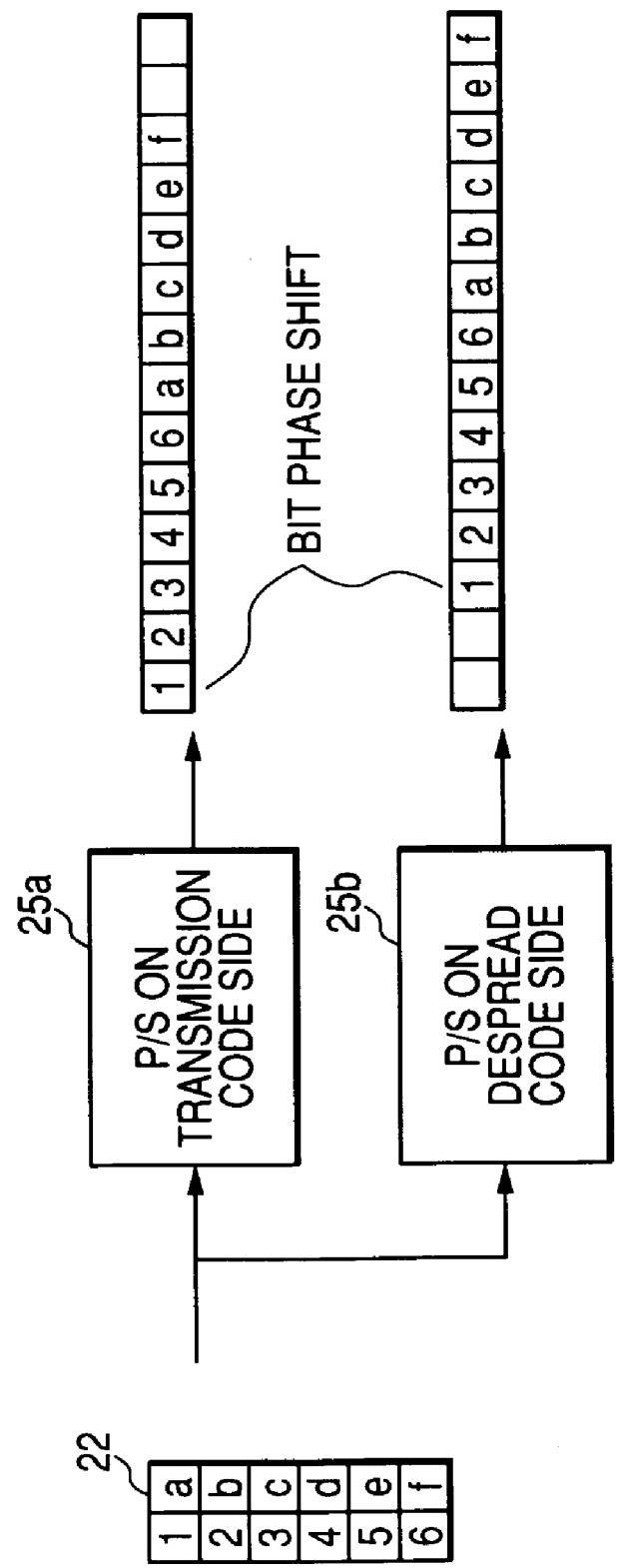
FIG. 11 is a view for explaining operations of a fourth embodiment of the invention.

FIG. 11 is a view for explaining a bit phase shift between the P/S conversion circuit 25a on the transmission code side and the P/S conversion circuit 25b on the despread code side. Codes generated by the code generation circuit 22 are subjected to high-speed parallel-serial conversion in the P/S conversion circuits 25a, 25b and then, the codes are output. However, since bit phases of the thus-output codes vary every time the power is turned on or the device is reset, the bit phases between the P/S conversion circuits 25a and 25b cannot be fixed to a certain phase relationship.

A PLL-containing P/S conversion circuit serving as a general-purpose component is generally configured integrally with a serial-parallel (S/P) conversion circuit; and a SerDes circuit also integrally includes a transmission-reception processing function.

Figure 12:
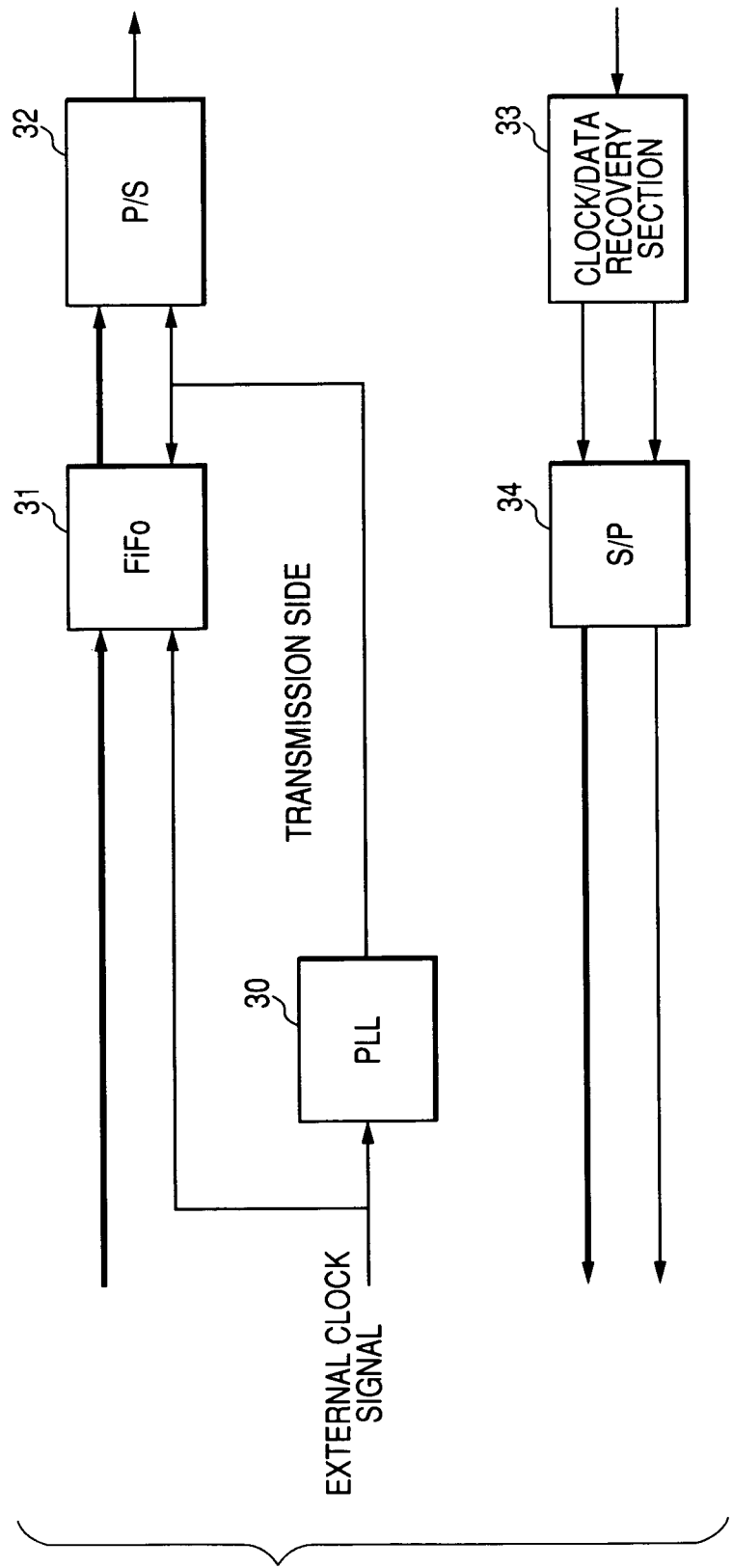
FIG. 12 is a view showing a configuration of a general PLL-containing P/S conversion circuit.

FIG. 12 shows a configuration of a general PLL-containing P/S-and-S/P integrated component. In the drawing, reference numeral 30 denotes a PLL circuit, 31 denotes a FiFo, and 32 denotes a P/S conversion circuit; all of which constitute the function on the transmission side. Reference numeral 33 denotes a clock/data recovery section, and 34 denotes an S/P conversion circuit; both of which constitute the function on the receiving side. Meanwhile, this component may not have the clock/data recovery section 33. As in the case of the P/S conversion circuits 25a and 25b shown in FIG. 11, many of the S/P conversion circuits 34 cannot control bit phases caused in the serial-parallel conversion.

Figure 13:
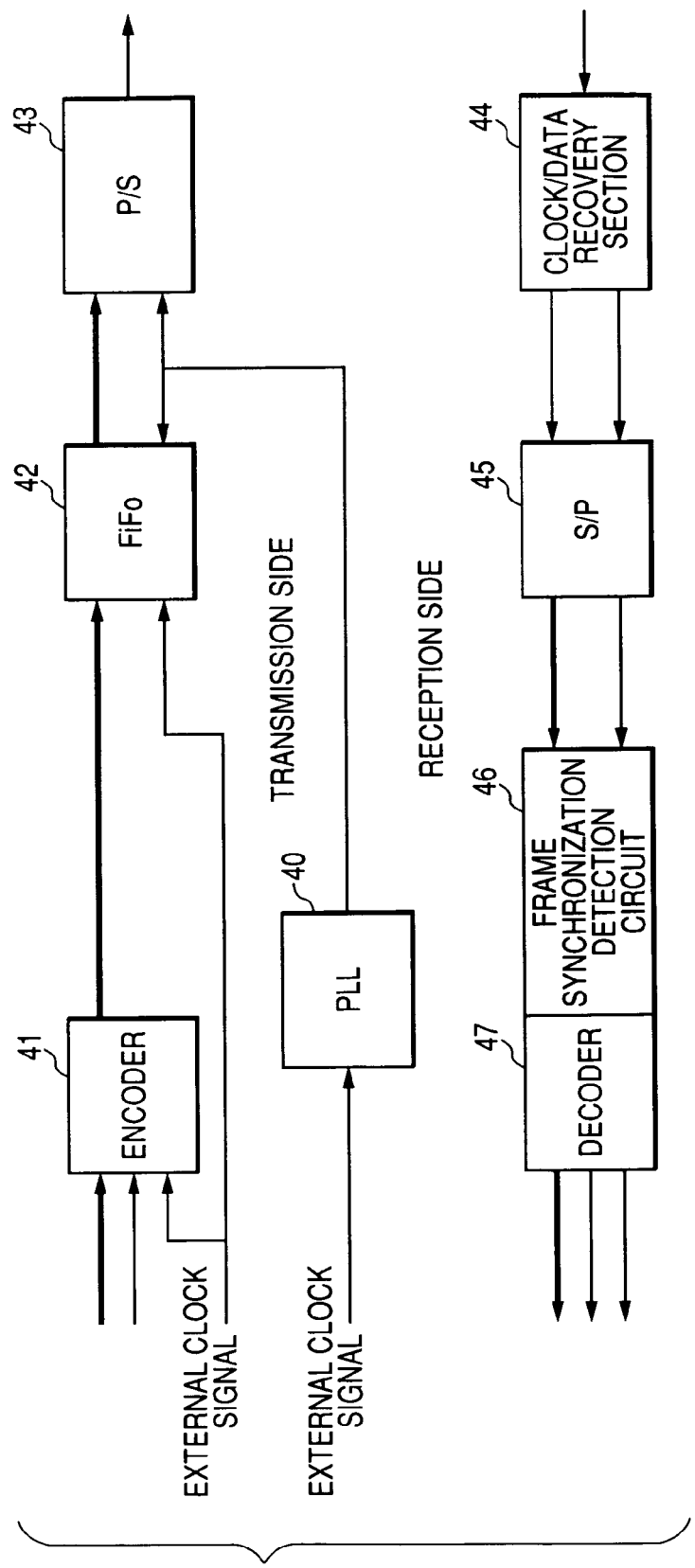
FIG. 13 is a view showing a configuration of a general SerDes circuit.

FIG. 13 shows the configuration of a general SerDes transmission-reception component. In the drawing, reference numeral 40 denotes a PLL circuit, 41 denotes an encoder, 42 denotes a FiFo, and 43 denotes a P/S conversion circuit; all of which constitute the function on the transmission side. In addition, reference numeral 44 denotes a clock/data recovery section, 45 denotes an S/P conversion circuit, 46 denotes a frame-synchronization detection circuit, and 47 denotes a decoder; all of which constitute the function on the receiving side. As in the case of the P/S conversion circuits 25a and 25b shown in FIG. 11, many of the S/P conversion circuits 45 cannot control bit phases caused in the serial-parallel conversion.

The present embodiment is configured so as to detect, a bit phase shift between the transmission code and the despread code by means of utilizing the above-mentioned transmission-reception function of the PLL-containing P/S conversion circuit component and to correct the detected bit phase shift. The configuration of the present embodiment will be described hereinafter while taking as an example a case where the PLL-containing P/S conversion circuit is formed of a SerDes circuit.

Figure 14:
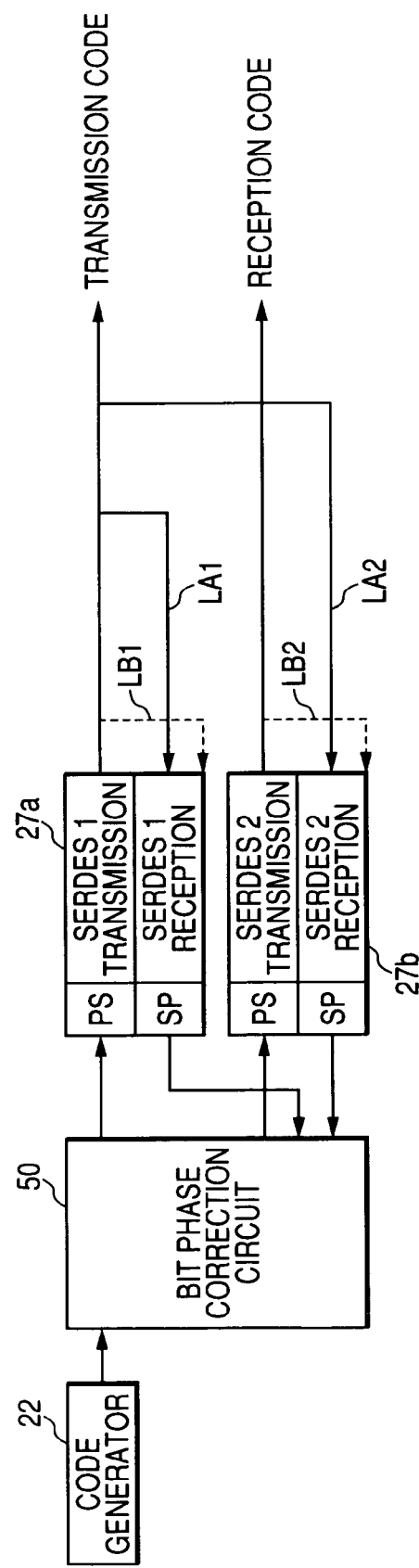
FIG. 14 is a block diagram showing a structure of an essential portion of a UWB radar apparatus according to the fourth embodiment of the invention.

FIG. 14 is a view showing control of bit phases between a transmission code and a despread code in a case where a SerDes circuit is employed. In the present embodiment, SerDes 1 (27a) for generation of a transmission code is taken as a reference side. There are disposed a loopback LAM for detection of a bit phase shift on the reception side of SerDes 1 with respect to the reference side, and a loopback LA2 for detection of a bit phase shift on the reception side of SerDes 2 (27b) with respect to the reference side.

In addition, a loopback LB1 for detection of a bit phase shift between a transmission section and a reception section in SerDes 1 and a loopback LB2 for detection of a bit phase shift between a transmission section and a reception section in SerDes 2 are disposed; and a bit phase shift between transmission-outputs from SerDes 1 and SerDes 2 is detected on the basis of bit phase shifts detected by the loopbacks. Reference numeral 50 in FIG. 14 is a bit phase correction circuit for detecting a bit phase shift between transmission-outputs from SerDes 1 and SerDes 2 on the basis of the respective loop backs, and for performing a bit phase adjustment on an input side of SerDes 1 or that of SerDes 2 on the basis of the detection result.

Hereinafter, determination of a bit shift amount and correction control in the bit phase adjustment circuit 50 will be described specifically by reference to FIGS. 14 and 15. In FIG. 14, SerDes 1 denoted by reference numeral 27a is a PLL-containing P/S conversion circuit, which generates a transmission code and includes a P/S conversion circuit for transmission and an S/P conversion circuit for reception. SerDes 2 denoted by-reference numeral 27b is a PLL-containing P/S conversion circuit, which generates a despread code and includes a P/S conversion circuit for transmission and an S/P conversion circuit for reception.

FIG. 15 shows reception-outputs from the respective loops in a case where a bit phase difference between SerDes 1 and SerDes 2 is two bits. When the reception-output from SerDes 1 in the loopback LA1 and that from SerDes 2 in the loopback LA2 are compared in the bit phase correction circuit 50 of FIG. 14, it can be seen that the reception-output from SerDes 2 is delayed with respect to the reception-output from SerDes 1 by an amount corresponding to four bits. Next, when the reception-output from SerDes 1 in the loopback LB1 and that from SerDes 2 in the loopback LB2 are compared in the circuit 50, it can be seen that the reception-output from SerDes 2 is delayed with respect to the reception-output from SerDes 1 by an amount corresponding to six bits.

The bit phase difference between the SerDes 1 and SerDes 2 on their transmission sides is equal to a bit phase difference between a reception-output from SerDes 2 of the loopback LA2 and that of the loop back LB2. Therefore, a result of the equation of 2 bits=6 bits−4 bits corresponds to a delay in transmission-output of the SerDes 2.

When a value of a bit phase shift between SerDes 1 and SerDes 2 is determined in the correction circuit 50 as described above, supply of a code to SerDes 2 is advanced by an amount corresponding to the thus-determined value. As a result, bit phases between SerDes 1 and SerDes 2 can be brought into coincidence.

The bit phase control circuit 50 shown in FIG. 14 is used in a form of being included in a circuit shown in FIG. 8 or FIG. 10.

The control for correcting the phase shift, shown in the third and fourth embodiments, must be conducted independently of a target detection processing, which is performed as a UWB radar apparatus. In addition, if the correction described in the fourth embodiment is conducted once at a time of power-on or resetting, generally, it is not necessary to conduct the correction again during usage of the radar apparatus. However, an unexpected phase shift will occur during actual usage due to anomaly caused by an external noise such as a spark noise or sudden change in power supply. In order to cope with such a condition, the control described in the third or fourth embodiment may be conducted periodically. In this case, such a frequency that deteriorates as little as possible detection processing of a target is preferably selected. Alternatively, the control may be conducted during a time when the UWB radar apparatus is not capturing a target.

By means of repeatedly performing the above-described control described in the third or fourth embodiment, stability in operations of the UWB radar apparatus can be secured during running of the vehicle.

What is claimed is:

1. A radar apparatus comprising:
  a code generator that generates a spectrum spread code and a despread code;
  a transmission section that transmits a signal modulated with the spectrum spread code;
  a reception section that receives a direct wave from the transmission section and a reflection wave of the transmitted signal from a target;
  a delay section that delays the despread code stepwise;

a despreading processor that performs a despreading processing with respect to a signal obtained from the reflection wave received, with using the despread code delayed;
a correlation value detector that detects a correlation value from data output from the despreading processor;
a target detector that detects a presence of the target from the correlation value detected; and
an adjustment section that adjusts a phase shift between the spectrum spread code and the despread code so that a correlation strength of the direct wave is equal to or larger than a predetermined value, wherein:
the code generator comprises a first PLL-circuit-containing parallel/serial conversion circuit for generation of the spectrum spread code and a second PLL-circuit-containing parallel/serial conversion circuit for generation of the despread code, and
the adjustment section comprises a delay control section that delays one of inputs to the first and second PLL-circuit-containing parallel/serial conversion circuits so that the correlation strength of the direct wave is equal to or larger than the predetermined value.

2. The radar apparatus according to claim 1, wherein:
the first PLL-circuit-containing parallel/serial conversion circuit further integrally comprises an serial/parallel conversion circuit for reception; and
the second PLL-circuit-containing parallel/serial conversion circuit further integrally comprises an serial/parallel conversion circuit for reception,
the radar apparatus further comprising:
a loopback section that loops back an output of the first PLL-circuit-containing parallel/serial conversion circuit to the serial/parallel conversion circuit of the second PLL-circuit-containing parallel/serial conversion circuit.

3. The radar apparatus according to claim 2, wherein the code generator further comprises a correction section that correct a bit phase shift between the spectrum spread code output from the first PLL-circuit-containing parallel/serial conversion circuit and the despread code output from the second PLL-circuit-containing parallel/serial conversion circuit on a basis of the output looped back.

4. A radar apparatus comprising:
a code generator that generates a spectrum spread code and a despread code;
a transmission section that transmits a signal modulated with the spectrum spread code;
a reception section that receives a reflection wave of the transmitted signal from a target;
a delay section that delays the despread code stepwise;
a despreading processor that performs a despreading processing with respect to a signal obtained from the reflection wave received, with using the despread code delayed;
a first correlation value detector that detects a correlation value from data output from the despreading processor;
a target detector that detects a presence of the target from the correlation value detected by the first correlation value detector; and
a second correlation value detector that detects a correlation value between the spectrum spread code and the despread code, which are generated by the code generator, wherein:
the code generator generates the spectrum spread code and the despread code on a basis of the correlation value detected by the second correlation value detector so that the correlation value detected by the second correlation value detector is equal to a predetermined value,
wherein the code generator comprises:
a first PLL-circuit-containing parallel/serial conversion circuit for generation of the spectrum spread code;
a second PLL-circuit-containing parallel/serial conversion circuit for generation of the despread code; and
a delay control section that delays one of inputs to the first and second PLL-circuit-containing parallel/serial conversion circuits so that the correlation value detected by the second correlation value detector is equal to the predetermined value.

5. The radar apparatus according to claim 4, wherein:
the first PLL-circuit-containing parallel/serial conversion circuit further integrally comprises an serial/parallel conversion circuit for reception; and
the second PLL-circuit-containing parallel/serial conversion circuit further integrally comprises an serial/parallel conversion circuit for reception,
the radar apparatus further comprising:
a loopback section that loops back an output of the first PLL-circuit-containing parallel/serial conversion circuit to the serial/parallel conversion circuit of the second PLL-circuit-containing parallel/serial conversion circuit.

6. The radar apparatus according to claim 5, wherein the code generator further comprises a correction section that correct a bit phase shift between the spectrum spread code output from the first PLL-circuit-containing parallel/serial conversion circuit and the despread code output from the second PLL-circuit-containing parallel/serial conversion circuit on a basis of the output looped back.

7. The radar apparatus according to claim 4, wherein the second correlation value detector detects the correlation value between the spectrum spread code and the despread code repeatedly at such a frequency as not to influence a detection processing of the target.

* * * * *